United States Patent [19]

Eyer et al.

[11] Patent Number: 5,134,700
[45] Date of Patent: Jul. 28, 1992

[54] MICROCOMPUTER WITH INTERNAL RAM SECURITY DURING EXTERNAL PROGRAM MODE

[75] Inventors: Mark K. Eyer, San Diego; Paul Moroney, Cardiff-By-The-Sea, both of Calif.

[73] Assignee: General Instrument Corporation, Chicago, Ill.

[21] Appl. No.: 98,270

[22] Filed: Sep. 18, 1987

[51] Int. Cl.$^5$ .............................................. G06F 12/14
[52] U.S. Cl. .................................. 395/425; 364/246.6; 364/969; 395/725
[58] Field of Search ... 364/200 MS File, 900 MS File

[56]  References Cited

U.S. PATENT DOCUMENTS

| | | | |
|---|---|---|---|
| 3,742.458 | 6/1973 | Inoue et al. | 364/200 |
| 4,183,085 | 6/1980 | Roberts et al. | 364/200 |
| 4,519,032 | 5/1985 | Mendell | 364/200 |
| 4,521,853 | 6/1985 | Guttag | 364/200 |
| 4,523,271 | 6/1985 | Levien | 364/200 |
| 4,590,552 | 5/1986 | Guttag et al. | 364/200 |
| 4,698,750 | 10/1987 | Wilkie et al. | 364/200 |

Primary Examiner—Michael R. Fleming
Assistant Examiner—C. Shin
Attorney, Agent, or Firm—Edward W. Callan

[57] ABSTRACT

A microcomputer which is operable in either an internal program mode, wherein the microcomputer functions in accordance with an internally stored program, or in an external program mode, wherein the microcomputer functions in accordance with a program stored in a memory external to the microcomputer, provides internal RAM security during the external program mode. The microcomputer includes an internal program memory for internally storing programs; a bus for connection to an external memory for carrying programs from the external program memory; a nonsecure RAM for storing nonsecure data; a secure RAM for storing secure data; a central processing unit for processing the stored data and/or externally provided data either in accordance with the internally stored programs or in accordance with programs stored in the external memory; and a controller for controlling interconnections between the internal program memory, the bus, the RAMs and the central processing unit in accordance with the mode of operation of the microcomputer; wherein during the external program mode, the controller inhibits access to the secure RAM. Code for accessing the secure data stored in the secure RAM is contained in a program stored in the internal program memory. The microcomputer is ideally suited for performing cryptographic operations utilizing cryptographic keys stored in or derived from the secure memory.

2 Claims, 1 Drawing Sheet

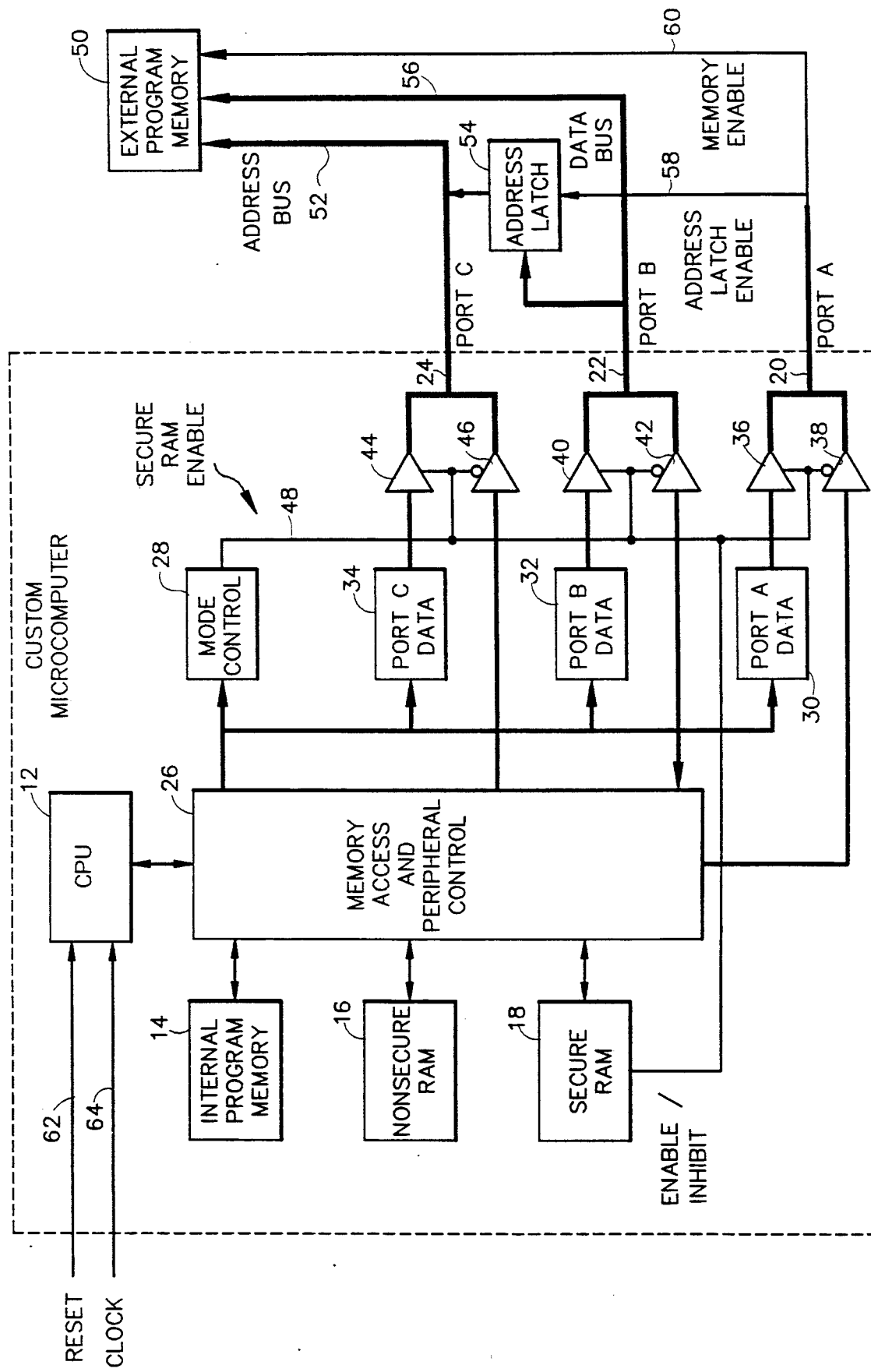

MICROCOMPUTER WITH INTERNAL RAM SECURITY DURING EXTERNAL PROGRAM MODE

BACKGROUND OF THE INVENTION

The present invention generally pertains to microcomputers and is particularly directed to providing security for data stored in the microcomputer when the microcomputer is operated in an external program mode.

A microcomputer essentially includes an internal program memory for internally storing programs; a bus for carrying data to and from the microcomputer; a random access memory (RAM) for storing data; a central processing unit for processing said stored data and/or data received over the bus in accordance with the internally stored programs; and a controller for controlling interconnections between the internal program memory, the bus, the RAM and the central processing unit in accordance with the mode of operation of the microcomputer.

For microcomputers that do not have an external program mode, wherein the operation of the microcomputer is in accordance with a program stored in an internal memory, the security of the data stored in the internal RAM is under the control of the program stored in the internal memory, and thereby security of such data may be assured. However, internal memory size is limited and may be enlarged only up to a certain point at which further expansion is not economically feasible because of increased silicon area and cost. Thus, for many applications, a microcomputer having an external program mode of operation is preferred for economic reasons.

In a prior art microcomputer having an external program mode of operation, the bus is connected to external memories for carrying programs from an external program memory and for carrying data to and from an external data memory; and the controller interconnects the bus to the internal RAM during the external program mode. Thus, operation of a prior art microcomputer in the external program mode affords an intruder access to the entire internal RAM, whereby sensitive data (such as access codes, authenticators, or secure variables) stored in the internal RAM may be accessed from outside the microcomputer and thereby compromised.

SUMMARY OF THE INVENTION

The present invention provides a microcomputer which is operable in either an internal program mode, wherein the microcomputer functions in accordance with an internally stored program, or in an external program mode, wherein the microcomputer functions in accordance with a program stored in a memory external to the microcomputer, without compromising the security of data stored in a designated internal RAM. The microcomputer of the present invention includes an internal program memory for internally storing programs; a bus for connection to an external program memory for carrying programs from the external program memory; a nonsecure RAM for storing nonsecure data; a secure RAM for storing secure data; a central processing unit for processing the stored data and/or externally provided data either in accordance with the internally stored programs or in accordance with programs stored in the external memory; and a controller for controlling interconnections between the internal program memory, the bus, the RAMs and the central processing unit in accordance with the mode of operation of the microcomputer; wherein during the external program mode, the controller inhibits access to the secure RAM, wherein during said internal program mode, the controlling means inhibits the central processing unit from responding to instructions from the external program memory; and wherein the controlling means may be placed in the external program mode in direct response to only instructions from the internal program memory. Code for accessing the secure data stored in the secure RAM is contained in a program stored in the internal program memory.

The microcomputer of the present invention is ideally suited for performing cryptographic operations. For cryptographic operations, the internal program memory stores a program for performing cryptographic operations upon data; and the secure RAM stores cryptographic key data required for performing the cryptographic operations.

Additional features of the present invention are described in relation to the description of the preferred embodiment.

BRIEF DESCRIPTION OF THE DRAWING

The FIG. 1 of the drawing is a diagram of a preferred embodiment of the microcomputer of the present invention coupled to an external program memory.

DESCRIPTION OF THE PREFERRED EMBODIMENT

Referring to the Drawing, the preferred embodiment of the microcomputer 10 of the present invention includes a central processing unit (CPU) 12, an internal program memory 14, a nonsecure RAM 16, a secure RAM 18, buses 20, 22, and 24 respectively connected to ports A, B, and C, and a controller. The controller includes a memory-access-and-peripheral-control unit 26, a mode control register 28, a port A data register 30, a port B data register 32, a port C data register 34, a first tri-state bus driver 36 coupling the port A data register 30 to the port A data bus 20, a second tri-state bus driver 38 coupling the memory-access-and-peripheral-control unit 26 to the port A data bus 20, a third tri-state bus driver 40 coupling the port B data register 32 to the port B data bus 22, a fourth tri-state bus driver 42 coupling the memory-access-and-peripheral-control unit 26 to the port B data bus 22, a fifth tri-state bus driver 44 coupling the port C data register 34 to the port C data bus 24, and a sixth tri-state bus driver 46 coupling the memory-access-and-peripheral-control unit 26 to the port C data bus 24. The fourth tri-state bus driver 42 is bidirectional. All of the other bus drivers are unidirectional and transfer data onto the respective port A, B and C buses 20, 22, 24 from the microcomputer 10.

The mode control register 28 provides a signal on line 48 indicating whether the microcomputer is in an internal program mode or an external program mode of operation. The mode indication signal on line 48 enables access to the secure RAM 18 during the internal program mode of operation and inhibits access to the secure RAM 18 during the external program mode of operation.

The port A bus 20 is a 2-bit control bus, which provides memory timing controls. The port B bus 22 is a multiplexed address/data bus, providing eight address bits and eight-bits of data for bidirectional transfer. The port C bus 24 provides eight additional address bits.

An external program memory 50 is coupled to the port A, B, and C buses 20, 22, and 24 of the microcomputer 10 by a 16-bit address bus 52, an address latch 54, an 8-bit data bus 56, an address latch enable line 58 and a memory enable line 60.

Additional input/output memory, or other peripheral devices may share the buses 20, 22, 24 along with the external program memory 50, given appropriate address decoding and interface circuitry. In the external program mode, the microcomputer 10 is, in effect, a general purpose microprocessor.

The CPU 12 receives reset and clock signals on lines 62 and 64 respectively.

On reset, instructions are fetched from the internal program memory 14; and the mode control register 28 is set to indicate the internal program mode, and thereby provides a signal on line 48 that enables access to the secure RAM 18. Such an indication on line 48 also enables the bus drivers 36, 40 and 44 to respectively transfer the contents of the port A data register 30 onto the port A bus 20, the contents of the port B data 32 register onto the port B bus 22, and the contents of the port C data register 34 onto the port C bus 24. At the same time the internal program mode indication on line 48 inhibits the bus drivers 38, 42 and 46 from transferring data. When in the internal program mode, the CPU 12 has access to both the secure RAM 18 and the nonsecure RAM 16, as well as to all of the peripheral registers, including port A data register 30, port B data register 32, port C data register 34 and, mode control register 28.

When operating in the internal program mode, all instructions are executed from the internal program memory 14; and internal bus activity is not accessible at the ports of the microcomputer. In the internal program mode, access to external program memory is not possible.

After power-up initialization is complete, program control may be passed to the external program memory 50 by first setting the mode control register 28 to provide an external-program-mode indication signal on line 48 to inhibit access to the secure RAM 18, and then branching externally via bus drivers 38, 42 and 46. The external-program-mode indication signal on line 48 also inhibits the bus drivers 36, 40 and 44 from transferring data from the port A, B, and C data registers 30, 32 and 34 onto the port A, B, and C buses 20, 22 and 24. Program control may be returned to the internal program memory 14 simply by branching to it.

When in the external program mode, the microcomputer's internal address and data buses are interconnected by the bus drivers 38, 42 and 46 to the external program memory 50, and control of the microcomputer is transferred to the external program memory 50. In the external program mode, access to the nonsecure RAM 16 is allowed, while access to the secure RAM 18 is inhibited.

In a typical operating scenario, after system reset and initialization, control is passed to the external program memory 50. When data is available requiring authentication or comparison with variables stored in secure RAM 18, the data is written into the nonsecure RAM 16 and a branch is made to an entry point in the internal program memory 14. The mode control register 28 is then accessed to select the internal program mode, so that operations using secure data with nonsecure data may be performed. Internal secure routines are executed, with the results, if any, being written into the nonsecure RAM 16. Finally, the mode control register 28 is accessed to select the external program mode, and a return is made to the calling routine in the external program memory 50.

Whenever the program code provided from the external program memory 50 causes a switch to the internal program mode, any following instructions from the external program memory 50 are ignored, since the switch to the internal program mode results in the mode control register 28 providing a mode indication signal on line 48 that inhibits the bus drivers 38, 42 and 46 from providing further access to the microcomputer by the external program memory 50. Since no device is available to place instruction data on the internal operating bus, the resulting value of zero is interpreted by the CPU 12 as a "do nothing" instruction. The microcomputer program counter then increments upwards until the first byte of the internal program memory 14 is reached, thus returning control to the internal program memory 50.

When the microcomputer 10 is adapted for performing cryptographic operations the programs stored in the internal program memory 14 contain cryptographic routines; and cryptographic keys and/or data required for deriving cryptographic keys are stored in the secure RAM 18. A "master" program stored in the external program memory 50 can utilize program subroutines stored in the internal program memory 14 to provide a "slave" cryptographic processor. This master program may be made to cause such a cryptographic processor to encrypt and store data, authenticate a block of data, and/or derive a new key from a previously stored key. Initially, data to be operated on by the cryptographic processor is placed in the nonsecure RAM 16 by the master program; and then the program branches to the internal program memory 14 for implementing the cryptographic processor. Cryptographic routines first enable the secure RAM 18; then access secure data, such as cryptographic keys, from the secure RAM 18; next perform cryptographic operations on the data; and finally store any results of such cryptographic processing in the nonsecure RAM 16. The microcomputer 10 is then switched back to the external program mode to allow the results to be accessed from the nonsecure memory 16 and to allow further processing in the external program mode.

Preferably, the internal program memory 14 is a read-only memory (ROM). The secure RAM 18 of the microcomputer may be provided with nonvolatility (CMOS with battery backup, or EEPROM, for example). The secure RAM 18 of the microcomputer may then be loaded with secure data at one physical location and later shipped to another location where all but properly authorized transactions are prohibited.

We claim:

1. A microcomputer that is operable in either an internal program mode, wherein the microcomputer functions in accordance with an internally stored program, or in an external program mode, wherein the microcomputer functions in accordance with a program stored in a memory external to the microcomputer, said microcomputer comprising an internal program memory for internally storing programs;

a bus for connection to an external program memory for carrying programs from said external program memory;

a nonsecure RAM for storing nonsecure data;

a secure RAM for storing secure data;

a central processing unit for processing data stored in said nonsecure RAM, data stored in said secure RAM and/or externally provided data either in accordance with said internally stored programs or in accordance with programs stored in said external program memory; and means coupled to the internal program memory, the bus, the RAMs and the central processing unit for controlling interconnections between the internal program memory, the bus, the RAMs and the central processing unit in accordance with the mode of operation of the microcomputer;

wherein the controlling means includes means for inhibiting access to the secure RAM during said external program mode;

means for inhibiting the central processing unit from responding to instructions within a program carried on the bus from the external program memory during said internal program mode; and means for branching the microcomputer to the external program mode in response to only instructions in a program stored in the internal program memory;

wherein the internal program memory stores a program for causing the central processing unit to perform cryptographic operations upon data;

wherein the secure RAM stores secure cryptographic key data required for performing said cryptographic operations; and wherein the external program memory stores a program for causing the microcomputer to perform the following sequence of routines:

(a) placing in the nonsecure RAM the data upon which the cryptographic operations are to be performed;

(b) branching the microcomputer to the internal program mode;

(c) performance by the central processing unit in accordance with said stored internal program of said cryptographic operations on the data placed in the nonsecure RAM during routine (a) with said secure cryptographic key data stored in the secure RAM; and wherein said program for performing cryptographic operations stored in the internal program memory is adapted for causing the microcomputer to perform the following sequence of routines:

(d) storing the results of said cryptographic operation in the nonsecure RAM; and (e) branching the microcomputer back to the external program mode to allow the results of said cryptographic operation to be accessed from the nonsecure RAM.

2. A microcomputer that is operable in either an internal program mode, wherein the microcomputer functions in accordance with an internally stored program, or in an external program mode, wherein the microcomputer functions in accordance with a program stored in a memory external to the microcomputer, said microcomputer comprising an internal program memory internally storing a program for causing the central processing unit to perform cryptographic operations upon data;

a bus for connection to an external program memory for carrying programs from said external program memory;

a nonsecure RAM for storing nonsecure data;

a secure RAM storing secure data, including secure cryptographic key data required for performing said cryptographic operations;

a central processing unit for processing data stored in said nonsecure RAM, data stored in said secure RAM and/or externally provided data either in accordance with said internally stored programs or in accordance with programs stored in said external program memory; and means coupled to the internal program memory, the bus, the RAMs and the central processing unit for controlling interconnections between the internal program memory, the bus, the RAMs and the central processing unit in accordance with the mode of operation of the microcomputer;

wherein the controlling means includes means for inhibiting access to the secure RAM during said external program mode;

wherein the external program memory stores a program for causing the microcomputer to perform the following sequence of routines:

(a) placing in the nonsecure RAM the data upon which the cryptographic operations are to be performed;

(b) branching the microcomputer to the internal program mode;

(c) performance by the central processing unit in accordance with said stored internal program of said cryptographic operations on the data placed in the nonsecure RAM during routine (a) with said secure cryptographic key data stored in the secure RAM; and wherein said program for performing cryptographic operations stored in the internal program memory is adapted for causing the microcomputer to perform the following sequence of routines:

(d) storing the results of said cryptographic operation in the nonsecure RAM; and (e) branching the microcomputer back to the external program mode to allow the results of said cryptographic operation to be accessed from the nonsecure RAM.

* * * * *